United States Patent
Haas et al.

(10) Patent No.: US 7,773,270 B2
(45) Date of Patent: Aug. 10, 2010

(54) IMAGE SCANNER FEATURE DETECTION

(75) Inventors: William R. Haas, Fort Collins, CO (US); Kirk S. Tecu, Greeley, CO (US); James S. Voss, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1982 days.

(21) Appl. No.: 10/752,779

(22) Filed: Jan. 7, 2004

(65) Prior Publication Data
US 2005/0146757 A1 Jul. 7, 2005

(51) Int. Cl.
H04N 1/04 (2006.01)
(52) U.S. Cl. ............... 358/474; 358/486; 358/447; 358/498; 382/199; 382/254; 399/380; 348/225.1; 375/240
(58) Field of Classification Search .......... 358/474, 358/487, 497, 498, 486, 475, 509, 496, 505, 358/465, 479; 382/199, 254, 282; 399/380, 399/376, 301; 348/225.1, 246; 375/240.27, 375/240.29
See application file for complete search history.

(56) References Cited

U.S. PATENT DOCUMENTS

| | | | | |
|---|---|---|---|---|
| 5,025,462 A * | 6/1991 | Saito et al. | ............ | 378/19 |
| 5,164,994 A * | 11/1992 | Bushroe | ............ | 382/150 |
| 5,463,720 A * | 10/1995 | Granger | ............ | 358/1.9 |
| 5,589,972 A * | 12/1996 | Tellam et al. | ............ | 359/196.1 |
| 5,629,126 A * | 5/1997 | Trutna, Jr. et al. | ............ | 430/139 |
| 5,818,610 A | 10/1998 | Bromley et al. | | |
| 5,844,697 A * | 12/1998 | Omvik et al. | ............ | 358/487 |
| 5,880,858 A * | 3/1999 | Jin | ............ | 358/487 |
| 5,896,470 A * | 4/1999 | Miyaza | ............ | 382/298 |
| 5,983,688 A * | 11/1999 | Anzai et al. | ............ | 72/15.1 |
| 6,043,941 A * | 3/2000 | Yamada et al. | ............ | 359/782 |
| 6,091,563 A | 7/2000 | Thomas, III et al. | | |
| 6,122,393 A | 9/2000 | Schweid et al. | | |
| 6,125,197 A * | 9/2000 | Mack et al. | ............ | 382/154 |
| 6,142,334 A * | 11/2000 | Kristensson | ............ | 220/270 |
| 6,147,743 A | 11/2000 | Fredlund et al. | | |
| 6,151,139 A * | 11/2000 | Haded et al. | ............ | 358/487 |
| 6,194,697 B1 * | 2/2001 | Gardner, Jr. | ............ | 250/208.1 |
| 6,198,088 B1 * | 3/2001 | Seachman | ............ | 250/208.1 |
| 6,246,642 B1 | 6/2001 | Gardner, Jr. et al. | | |
| 6,282,326 B1 * | 8/2001 | Lee et al. | ............ | 382/289 |
| 6,430,320 B1 * | 8/2002 | Jia et al. | ............ | 382/289 |
| 6,512,238 B1 * | 1/2003 | Iwaki | ............ | 250/559.4 |
| 6,556,721 B1 * | 4/2003 | Wang et al. | ............ | 382/282 |
| 6,587,592 B2 * | 7/2003 | Georgiev et al. | ............ | 382/254 |
| 6,649,918 B2 | 11/2003 | Arakawa et al. | | |
| 6,972,877 B1 * | 12/2005 | Nakamura | ............ | 358/474 |
| 7,119,926 B2 * | 10/2006 | Takeda et al. | ............ | 358/1.9 |
| 7,199,909 B2 * | 4/2007 | Han et al. | ............ | 358/474 |

(Continued)

FOREIGN PATENT DOCUMENTS

EP 0700980 11/1999

*Primary Examiner*—Negussie Worku

(57) ABSTRACT

Systems are disclosed for detecting an unwanted artifact in an image scanner. An exemplary system includes a treated component of the image scanner, the treated component treated such that light reflects differently from the treated component than light reflected by an image being scanned by the image scanner. The light reflected from the treated component facilitates detection and removal of the unwanted artifact in the image being scanned, the unwanted artifact caused by the light reflected by the treated component.

17 Claims, 3 Drawing Sheets

U.S. PATENT DOCUMENTS

| | | | |
|---|---|---|---|
| 2001/0000979 A1* | 5/2001 | Han et al. | 358/474 |
| 2002/0122216 A1* | 9/2002 | Konagaya | 358/505 |
| 2002/0131094 A1* | 9/2002 | Koshimizu et al. | 358/509 |
| 2003/0039402 A1* | 2/2003 | Robins et al. | 382/275 |
| 2003/0174371 A1* | 9/2003 | Koshimizu et al. | 358/509 |
| 2003/0231801 A1* | 12/2003 | Baggs et al. | 382/254 |
| 2004/0022450 A1* | 2/2004 | Chang | 382/275 |
| 2004/0027618 A1* | 2/2004 | Nakamura et al. | 358/3.26 |
| 2004/0156545 A1* | 8/2004 | Kim | 382/170 |
| 2005/0152616 A1* | 7/2005 | Bailey | 382/275 |
| 2005/0179954 A1* | 8/2005 | Arai et al. | 358/3.26 |
| 2006/0045372 A1* | 3/2006 | Wang et al. | 382/254 |

* cited by examiner

FIG. 2

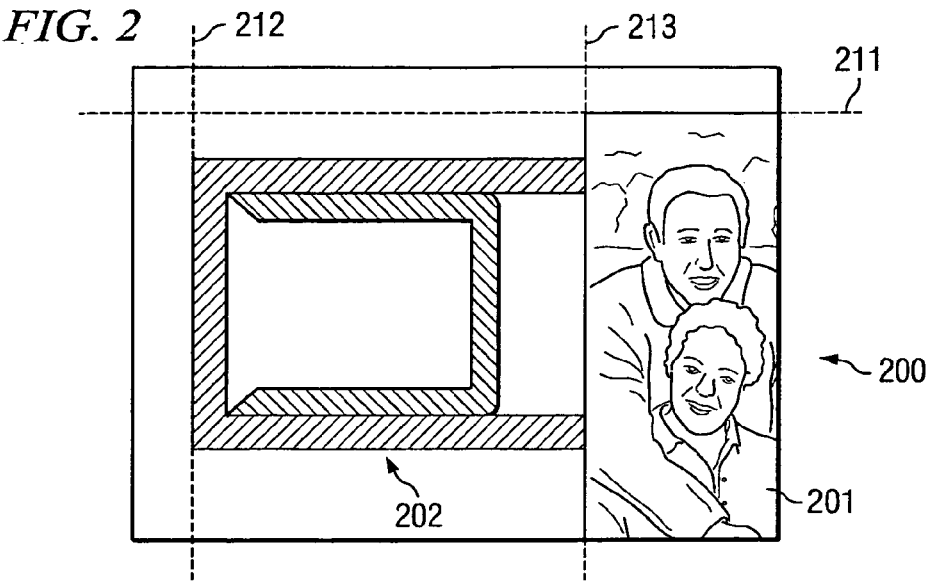

FIG. 3

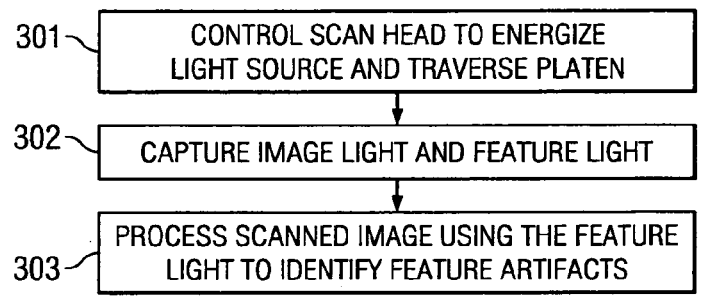

301 — CONTROL SCAN HEAD TO ENERGIZE LIGHT SOURCE AND TRAVERSE PLATEN

302 — CAPTURE IMAGE LIGHT AND FEATURE LIGHT

303 — PROCESS SCANNED IMAGE USING THE FEATURE LIGHT TO IDENTIFY FEATURE ARTIFACTS

FIG. 4

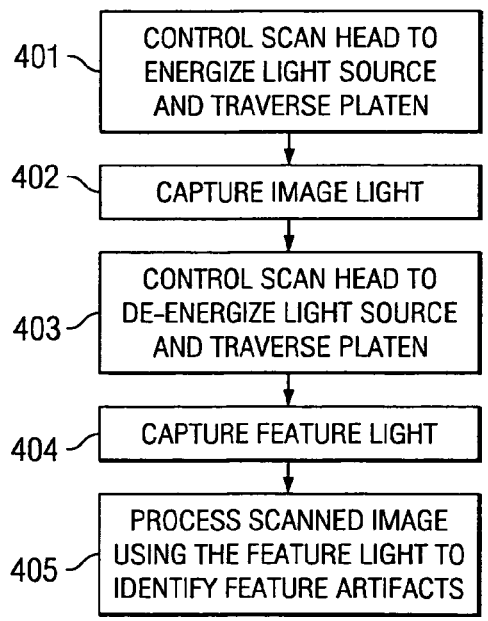

401 — CONTROL SCAN HEAD TO ENERGIZE LIGHT SOURCE AND TRAVERSE PLATEN

402 — CAPTURE IMAGE LIGHT

403 — CONTROL SCAN HEAD TO DE-ENERGIZE LIGHT SOURCE AND TRAVERSE PLATEN

404 — CAPTURE FEATURE LIGHT

405 — PROCESS SCANNED IMAGE USING THE FEATURE LIGHT TO IDENTIFY FEATURE ARTIFACTS

FIG. 5

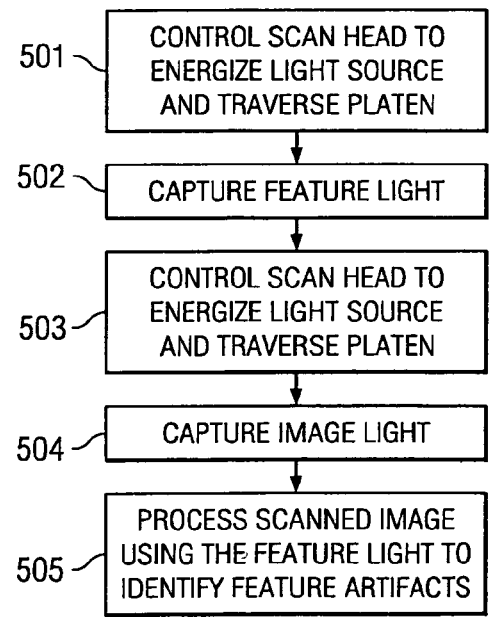

501 — CONTROL SCAN HEAD TO ENERGIZE LIGHT SOURCE AND TRAVERSE PLATEN

502 — CAPTURE FEATURE LIGHT

503 — CONTROL SCAN HEAD TO ENERGIZE LIGHT SOURCE AND TRAVERSE PLATEN

504 — CAPTURE IMAGE LIGHT

505 — PROCESS SCANNED IMAGE USING THE FEATURE LIGHT TO IDENTIFY FEATURE ARTIFACTS

IMAGE SCANNER FEATURE DETECTION

FIELD OF INVENTION

The invention relates generally to image scanning and, more particularly, to image scanner feature detection.

DESCRIPTION OF RELATED ART

Image scanners are used in a variety of applications to scan various media, such as photographs, transparencies, slides, negatives, documents, books, and other objects. Such image scanners often operate by providing translation or movement of a carriage, such as may include a light source and optical array (often referred to as a "scan head"), along a platen, which is generally a plate of glass or other transparent material, against which a medium to be scanned is placed.

In order to handle one or more of the above media types, image scanners often include apparatus such as an automatic document feeder (ADF) or a transparent media adapter (TMA). For example, in order to properly scan a transparent medium, such as a photo-negative or a slide (as opposed to a reflective medium, such as a photograph or document), an image scanner may be provided with a TMA including a backlight. In use, the backlight may be placed such that a transparent medium is disposed between the backlight and a scan head of the image scanner, thereby providing incident light to the scan head for acquisition of an image from the transparent medium. The TMA may include features useful in scanning transparent media in addition to the aforementioned backlight, such as a calibration window and a slide or negative mounting.

In some configurations, a TMA may be an optional accessory placed upon the platen of an image scanner when transparent media is being scanned. However, as scanners have developed to be more and more robust in their features, apparatus such as ADFs and TMAs have been integrated into the scanner itself, such as by being disposed in a scanner lid which hingedly covers the scanner platen. Although such an integrated configuration provides convenience with respect to the availability of the ADF and TMA features, integrated configurations sometimes do not provide optimal scanned images because aspects of the feature itself, e.g., a portion of the ADF and/or TMA apparatus, appears in the resulting scanned image. For example, undesirable image artifacts may cause an automatic cropping feature to not only include a desired image (e.g., a photograph) but also include an image of a portion of the scanner feature in the resulting scanned image. As a result, a user may be required to manually intervene and select the desired portion of the scanned image. Such manual intervention may be particularly undesirable where a number of documents are being scanned, such as during use of the aforementioned ADF.

One past attempt at addressing the appearance of undesirable image artifacts in a resulting scanned image has been to manually block or cover the offending scanner features. For example, a scanner may be provided with a sheet, e.g., a white plastic membrane, sized to obscure particular scanner features from a scanned images. Often the sheet is the same size as the scanner platen, so that it not only covers the particular feature to be obscured, it covers the whole surface of the scanner lid exposed to the platen. The use of the foregoing sheets typically requires the user to manually install the sheet when features are to be obscured and to manually remove the sheet when the features are to be utilized. Moreover, the sheet must be stored and protected from damage when not installed in the scanner.

BRIEF SUMMARY OF THE INVENTION

An embodiment provides a system for image scanner feature detection comprising an image scanner feature treated to facilitate detection of an associated feature artifact in a scanned image, the treated image scanner feature providing a predetermined optical diversity attribute.

BRIEF DESCRIPTION OF THE DRAWINGS

FIG. 2 shows an example of a scanned image resulting from use of the image scanner of FIGS. 1A and 1B;

FIG. 3 shows a flow diagram of image scanning and processing according to one embodiment of the present invention;

FIG. 4 shows a flow diagram of image scanning and processing according to an alternative embodiment of the present invention; and FIG. 5 shows a flow diagram of image scanning and processing according to another alternative embodiment of the invention.

DETAILED DESCRIPTION

Figure 1A:
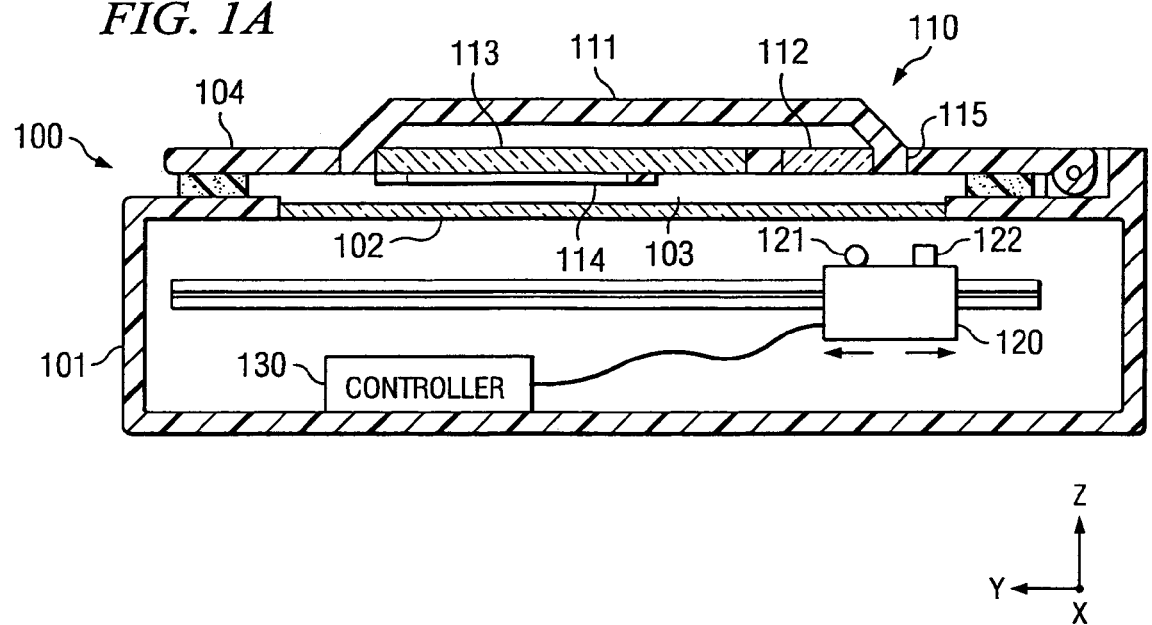
FIGS. 1A and 1B show an image scanner adapted according to an embodiment of the present invention.

Directing attention to FIG. 1A, an embodiment of an image scanner adapted according to an embodiment of the present invention is shown. Specifically, scanner 100, or a portion thereof, is adapted to facilitate identification of features, such as a TMA, ADF, or other aspect, that may result in unwanted artifacts appearing in a scanned image. Embodiments are described herein with reference to particular scanner features, such as a TMA or an ADF, for ease of understanding concepts of various embodiments of the present invention. However, concepts of the present invention are applicable to any number of scanner features and, therefore, are not limited to any particular example set forth herein.

Embodiments of the invention facilitate identification of features that may contribute to unwanted artifacts in a scanned image by causing these features to emit light (referred to herein as feature light) that is different or diverse in some way from the light a desirable object would be likely to emit, whether by reflection (e.g., solid objects) or by transmission (e.g., transparent objects), (referred to herein as image light). For example, feature light may comprise light having a wavelength typically not associated with a scanned image, such as infra-red or ultra-violet, or light emitted at a time during which scanned media or objects are unlikely to emit light. The feature light may be utilized by a controller or algorithm in identifying the presence and/or position of a feature artifact as present in a scanned image, and thus perform operations to identify the feature artifact for subsequent processing and/or to remove or mask the feature artifact from the scanned image.

In the embodiment of FIG. 1A, scanner 100, such as may comprise a flat bed image scanner useful in digitizing images of various media or other objects for use in digital processing, is shown as including housing 101 supporting platen 102. Platen 102 provides a transparent surface against which media may be placed for image-capturing operations by scanner 100. For example, a medium may be placed against platen 102 within imaging area 103, formed between platen 102 and scanner lid 104, for operation of scanner 100 to capture an image thereof for digital processing. Accordingly, carriage 120, shown here hosting light source 121 and optical array 122 (such as may provide a linear array of optical elements extending along the X axis), may be driven along the Y axis under control of controller 130 to traverse the length of platen 102 and thereby capture a series of line images that may be composited to create a scanned image.

Scanner 100 of the illustrated embodiment includes an enhanced media-handling apparatus disposed in scanner lid 104. Specifically, scanner 100 of FIG. 1A includes TMA 110 disposed in scanner lid 104 to correspond with at least a portion of platen 102, thereby facilitating use of TMA 110 to handle particular media types for scanning by scanner 100.

TMA 110 of the illustrated embodiment includes calibration window 112, media backlight window 113, media adapter 114, frame 115, and housing 111, such as may incarcerate a backlight mechanism and circuitry. In operation, a transparent medium is placed within imaging area 103, in juxtaposition with media backlight window 113, for operation of scanner 100 to capture an image thereof for digital processing. Backlight window 113 is illuminated via a backlight mechanism within housing 111 to provide light that passes through backlight window 113 and through the transparent medium to fall incident upon optical array 122 as scan head 120 is passed along the length of the medium. Calibration window 112 is used to calibrate the image captured by optical array 122 (e.g., to set white balance, light intensity, etcetera) and, therefore, is not blocked by the transparent medium during the aforementioned operation. Media adapter 114 may be utilized to hold transparent media of different sizes and/or configurations, such as to accommodate photonegatives having a smaller width dimension than slides that may also be accommodated by scanner 100.

Figure 1B:
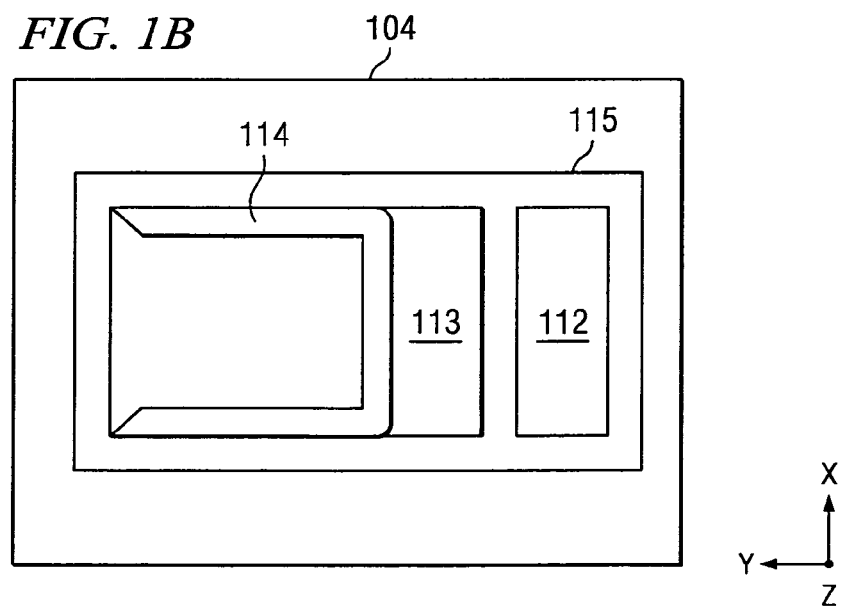

FIG. 1B shows a bottom view of a portion of scanner lid 104 and TMA 110 as is visible to optical array 122 through platen 102 when scan head 120 traverses platen 102. As can be seen in the scanned image of FIG. 2, when no document, or a document smaller than the area of platen 102, is placed in imaging area 103, a portion of the scanner feature, here TMA 110, is visible to the optical array and, therefore, is included in a resulting scanned image if no corrective action is otherwise taken. Specifically, image 200 of FIG. 2 includes not only image portion 201 corresponding to a photograph positioned in imaging area 103, but also includes undesired artifacts in image portion 202 associated with TMA 110. Accordingly, if an automatic image cropping algorithm were applied to image 200, such as by controller 130 of scanner 100 and/or a host system thereof, cropping lines 211 and 212 may result, thereby defining a scanned image including the desired photograph as well as the undesired scanner feature artifact.

Figure 1C:
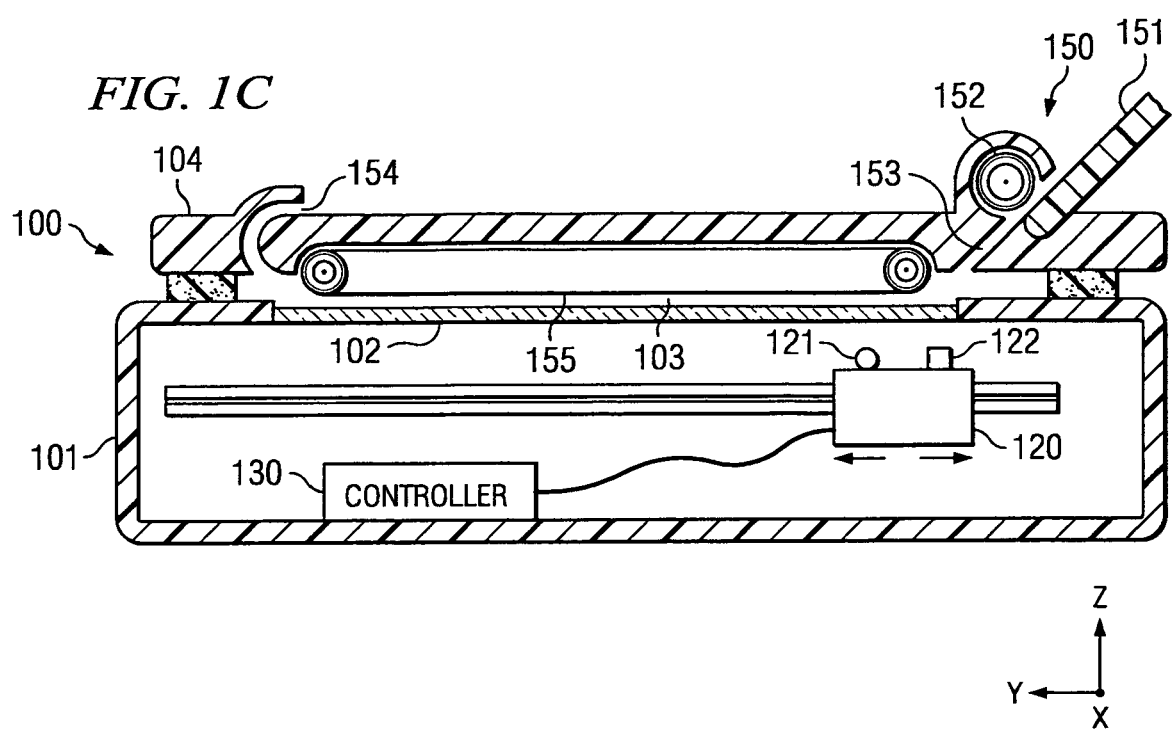
FIGS. 1C and 1D show another embodiment of an image scanner adapted according to an embodiment of the present invention.

Scanner 100 of FIG. 1C includes enhanced media-handling apparatus disposed in scanner lid 104 in the form of ADF 150. ADF 150 of the illustrated embodiment includes media tray 151, take-up roller 152, media input orifice 153, media handling belts 155, and media output orifice 154. In operation, media is placed on media tray 151 and is singulated by take-up roller 152 for introduction into imaging area 103 via media input orifice 153. Media handling belts 155 position a medium for operation of scanner 100 to capture an image thereof for digital processing and then eject the medium from imaging area 103 via media output orifice 154.

Figure 1D:
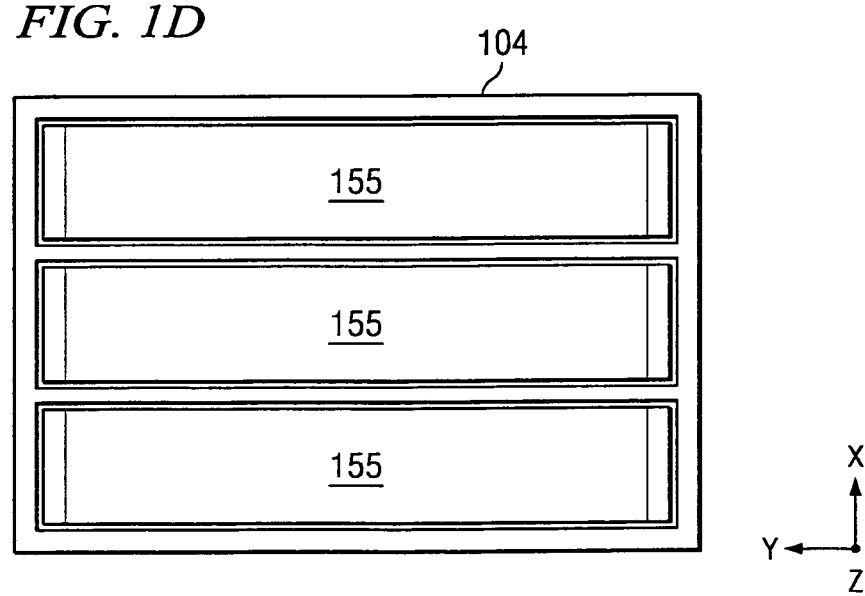

FIG. 1D shows a bottom view of a portion of scanner lid 104 and ADF 150 as is visible to optical array 122 through platen 102 when scan head 120 traverses platen 102. When no document, or a document smaller than the area of platen 102, is placed in imaging area 103, a portion of the scanner feature, here media handling belts 155 of ADF 150, is visible to the optical array and, therefore, is included in a resulting scanned image if no corrective action is otherwise taken.

However, scanner 100 has been adapted according to an embodiment of the present invention to cause the enhanced media handling apparatus, or e.g., TMA 110 of FIG. 1A and/or ADF 150 of FIG. 1C, or portions thereof, to emit a predetermined feature light, wherein the predetermined feature light is selected so as to be unlikely to be emitted by media or objects being scanned. Feature light emission according to embodiments of the present invention may be distinguished from light associated with a medium or other object being scanned by having one or more diverse characteristics, including a unique characteristic wavelength, a unique pattern, a unique emission time (e.g., emission at a time different than when substantial light associated with a medium or other object being scanned is present), a unique intensity and/or the like. According to embodiments of the invention, scanner imaging apparatus, such as scan head 120, is adapted to capture and recognize the feature light emitted from media handling apparatus.

According to one embodiment, aspects of TMA 110, or other media handling apparatus, are treated with a material or otherwise adapted to cause aspects of the media handling apparatus to emit a particular wavelength or wavelengths of light. This embodiment may be thought of as providing wavelength diversity for feature identification. For example, TMA 110 may be coated with a fluorescent paint, such as is available from Rosco Laboratories, Markham, Ontario, to cause TMA 110, or portions thereof, to emit light having a wavelength unique to the fluorescent paint used, thereby providing a feature light which may be recognized for further processing.

According to another embodiment, aspects of TMA 110, or other media handling apparatus, are treated with a material or otherwise adapted to cause aspects of the media handling apparatus to emit light at a time other than when a medium or other object is being scanned. This embodiment may be thought of as providing time diversity for feature identification. For example, TMA 110 may be coated with a phosphorescent paint, such as is available from Shannon Luminous Materials, Inc., Santa Ana, Calif., to cause TMA 110, or portions thereof, to emit light at a time other than when a medium or other object is being scanned, thereby providing a feature light that may be recognized for further processing.

Although the embodiments described above facilitate identification of features using wavelength diversity and time diversity, alternative embodiments of the present invention may implement optical diversity in addition to or in the alternative to the exemplary diversity aspects. For example, embodiments of the present invention may utilize an intensity diversity technique, wherein feature light is provided at a substantially higher or lower intensity than the image light expected to result from a scanned medium or other object. That is, the feature or portions thereof may be configured to provide a feature light which is greater or less than image light by a threshold value, as may be determined by pixel intensity values or other techniques. Some embodiments may employ a combination of one or more of the foregoing diversity techniques.

In the foregoing embodiments, light otherwise emitted by scanner 100 during a scanner operation, e.g., white light emitted by light source 121 for a scanning operation, may be utilized in providing a feature light useful as described herein. Specifically, the wavelength diversity embodiment described above may operate to convert wavelengths of light that are normally present in the scanner (e.g., the aforementioned white light) to wavelengths of light that are not normally present in the scanner (e.g., infra-red light). Similarly, the time diversity embodiment described above may operate to store light energy from light that is normally present in the scanner (e.g., the aforementioned white light) and re-radiate the light energy at a later time (e.g., subsequent to an image scan). Accordingly, the feature may then emit feature light that is diverse in at least one aspect from light used in acquiring a desired scanned image.

Embodiments of the invention may additionally or alternatively adapt scan head 120 to capture emitted feature light and/or to cause TMA 110 to emit the feature light. For example, in some wavelength diversity embodiments, light source 121 is adapted to emit a frequency of light (e.g., ultra-violet) known to stimulate emission of light having a particular wavelength or wavelengths of light by TMA 110. Similarly, optical array 122 is adapted to capture a light frequency or intensity corresponding to the feature light. According to one embodiment, optical array 122 comprises a light detection circuit, such as a charge-coupled device (CCD) or complementary metal-oxide semiconductor (CMOS) optical receiver, that is adapted to capture light having the aforementioned characteristic wavelength, e.g., infra-red, so that optical array 122 not only senses red, green, and blue, but also senses light having a wavelength different than this typical visible spectrum.

In some time diversity embodiments, light source 121 is adapted to emit a frequency of light (e.g., ultra-violet) known to stimulate emission of light by TMA 110, such as to increase the time constant (rate of decay of light emission after stimulus) and/or to increase the intensity of light. Similarly, optical array 122 is adapted to capture a light frequency or intensity corresponding to the feature light at a time other than during scanned image capture. According to one embodiment, optical array 122 comprises a light detection circuit, such as a CCD device, that is adapted to capture low intensity light so that optical array 122 not only senses well lighted scanned media, but also senses the low intensity emissions associated with phosphorescence.

Image processing algorithms utilize the presence of feature light in a scanned image, or otherwise available from operation of the image scanner, to intelligently process the image. Image processing utilizing feature light may include detecting the presence of a feature artifact in an image, notifying an operator of the presence of a feature artifact in an image, providing image manipulation associated with the feature artifact (whether automated or in response to operator input), and/or combinations thereof. Image processing algorithms providing the foregoing image processing may be provided within scanner 100 itself (e.g., firmware or software operable upon controller 130) and/or provided within a host system (e.g., software operable upon a personal computer coupled to scanner 100).

According to embodiments of the invention, image processing algorithms utilize the presence of feature light to remove or otherwise mask artifacts in the image associated with TMA 110. For example, an automatic image cropping algorithm, such as provided by controller 130 of scanner 100 and/or a host system thereof, may be applied to scanned image 200 of FIG. 2 such that cropping lines 211 and 213 result, thereby defining a scanned image including the desired photograph without the undesired scanner feature artifact.

Directing attention to FIGS. 3, 4, and 5, flow diagrams setting forth operation according to embodiments for identification of features that may result in unwanted artifacts appearing in a scanned image are shown. Specifically, FIG. 3 shows a flow diagram of operation according to a wavelength diversity and/or intensity diversity embodiment and FIG. 4 shows a flow diagram of operation according to a time diversity embodiment. FIG. 5 shows a flow diagram of operation according to an embodiment which may implement wavelength diversity, intensity diversity, and/or time diversity.

FIG. 3 shows operation according to wavelength diversity and intensity diversity implementations according to embodiments of the present invention. The embodiment of FIG. 3 begins an image capturing operation by energizing light source 121 to emit light which passes through platen 102 and is reflected by a medium or other object disposed in imaging area 103, and as may be reflected by any scanner features visible through platen 102 (box 301). Controlling scan head 120 further includes moving scan head 120 to traverse platen 102 along the Y axis (FIG. 1), such as under control of controller 130. As scan head 120 traverses platen 102, light energy from light source 121 falls incident on TMA 110 adapted according to the present invention, thereby resulting in portions of TMA 110 being stimulated to re-radiate (e.g., fluoresce) feature light having a characteristic wavelength and/or an intensity different than that likely to be reflected by the medium or object being scanned. Optical array 122 captures light reflected by the medium or other object disposed in imaging area 103 as well as light reflected from TMA 110 or other features of scanner 100 visible through platen 102 (image light). The captured image light forms a scanned image (box 302). Optical array 122 further captures light emitted by TMA 110 (feature light) having a characteristic wavelength and/or intensity different than that typically found in the captured image light. Using the feature light information, an image processing algorithm can identify portions of a scanned image associated with or resulting from TMA 110 and process the scanned image accordingly, such as to mask or remove a feature artifact (box 303).

The time diversity embodiment of FIG. 4, like the embodiment of FIG. 3, begins an image capturing operation by energizing light source 121 to emit light that passes through platen 102 and is reflected by a medium or other object disposed in imaging area 103. The light from light source 121 may also be reflected by any scanner features visible through platen 102. Controlling scan head 120 further includes controlling scan head 120 to traverse platen 102 along the Y axis, such as under control of controller 130 (box 401). As scan head 120 traverses platen 102, light energy from light source 121 falls incident on TMA 110 adapted according to the present invention, thereby resulting in portions of TMA 110 absorbing a portion of the light energy for re-radiation (e.g., phosphoresce) at a later time (e.g., having a time constant of 30 to 60 seconds). Optical array 122 captures light reflected by the medium or other object disposed in imaging area 103 as well as light reflected from TMA 110 or other features of scanner 100 visible through platen 102 (image light) (box 402). The captured image light forms a scanned image. The time diversity embodiment illustrated in FIG. 4 controls scan head 120 to de-energize the light source and traverse platen 102 (box 403). For example, after completing an image scanning pass in the positive Y direction, light source 121 may be extinguished and scan head 120 returned to a home position, thereby traversing platen 102 in the negative Y direction. Optical array 122 captures light emitted by TMA 110 (feature light) during this scan head pass when little or no image light will be present (box 404). Using the feature light information, an image processing algorithm can identify portions of a scanned image associated with or resulting from TMA 110, and process the scanned image accordingly, such as to mask or remove a feature artifact (box 405).

The embodiment of FIG. 5 begins operation by energizing light source 121 to emit light that passes through platen 102 and illuminates TMA 110 as scan head 120 traverses platen 102 (box 501). The illumination of TMA 110 may be at a time in which no medium is disposed in imaging area 103. Irrespective of whether wavelength diversity, intensity diversity, or time diversity is used, optical array 122 is utilized to capture light emitted by TMA 110 (feature light) (box 502). The captured feature light may be utilized with respect to subsequent image scans and, therefore, may be stored for use in processing such subsequent image scans. Accordingly, after capture of feature light, processing according to box 502 may control scan head 120 to de-energize light source 121 to await invocation of a subsequent image scan. When a medium is to be image scanned, light source 121 is energized and scan head 120 traverses platen 102 (box 503). Light from light source 121 is reflected by a medium or other object disposed in imaging area 103, as well as by any scanner features visible through platen 102. Optical array 122 captures light reflected by the medium or other object disposed in imaging area 103 as well as light reflected from TMA 110 or other features of scanner 100 visible through platen 102 (image light) (box 504). The captured image light forms a scanned image. Using the feature light information, an image processing algorithm can identify portions of a scanned image associated with or resulting from TMA 110, and process the scanned image accordingly, such as to mask or remove a feature artifact (box 505).

In processing the scanned images according to the embodiments described above, scanned image pixel positions corresponding to pixel positions in which feature light was detected may be identified as a portion of a feature artifact with a high level of confidence. For example, comparing or overlaying a pixel array of a scanned image formed from image light and a pixel array formed from feature light may be utilized to identify the portions of the scanned image in which a feature artifact is present. According to one embodiment, any scanned-image pixels corresponding to feature-image pixels may be removed or masked in the scanned image to thereby provide a scanned image which is free of the feature artifact.

Additionally or alternatively, scanned-image cropping lines (e.g., outlines of a desired portion of a scanned image) may be accurately placed by identifying a feature-light pixel position nearest to an image scan beginning point or other reference point. For example, according to embodiments, it may be assumed that the scanned object is rectangular, thereby enabling a cropping algorithm to select correct scanned image area as that area between a scan starting point and the first point in both the X and Y axes in which feature light is detected. That is, the algorithm may reference a horizontal cropping line (a line along the X axis) and move this line toward the scan beginning point until feature light is not included in the area and a scanned image is detected. Likewise, the algorithm may reference a vertical cropping line (a line along the Y axis) and move this line toward the scan beginning point until feature light is not included in the area and a scanned image is detected. According to embodiments, a scanned object may be placed anywhere within an imaging area and, therefore, feature light may be detected in various areas around a scanned object, perhaps including completely surrounding the scanned object. Accordingly, embodiments of the invention may facilitate recognition of a scanner feature, or portions thereof, in any number of positions with respect to a scanned object. Moreover, embodiments of the invention facilitate removal or masking of portions of the scanned image, such as using a plurality of vertical and/or a plurality of horizontal cropping lines, to provide a scanned image which is free of a feature artifact.

Embodiments may additionally or alternatively operate to suspend image capturing when feature light is detected in an image scan. For example, where a scanned object is placed in the center of platen 102, optical array 122 may capture feature light in a scan pass of carriage 120 before the scanned object is encountered. Algorithms of controller 130 may operate to discard image data captured by optical array 122 during the time in which such image data includes feature light. Accordingly, a resulting scanned image may begin with the scanned object, although a scanner feature is encountered in the scan prior to encountering the scanned object. The foregoing discarding of image data which includes feature light may additionally or alternatively be applied to situations in which the scanner feature is encountered in a scan after the scanned object or in various other situations.

Although the embodiments discussed above with reference to FIGS. 3 and 4 provide single scan head pass operation with respect to the configuration using a fluorescent technique and double scan head pass operation with respect to the configuration using a phosphorescent technique, the concepts of the present invention are applicable to different embodiments. For example, according to one embodiment, a first scan head pass is made to capture image light and form a scanned image and a second scan head pass is made with a light source energized to capture feature light resulting from fluorescence of aspects of a feature. According to another embodiment, a first scan head pass is made to capture image light and feature light, wherein the feature light comprises light resulting from phosphorescence of aspects of a feature having a wavelength different than that of the image light.

The foregoing embodiments provide a solution in which undesired feature artifacts present in a scanned image may be automatically detected, removed, and/or otherwise dealt with. In contrast to a technique using a masking sheet or other visual block to cover features, and thus avoid an undesired artifact in a resulting scan, embodiments of the present invention do not depend upon actions of an operator in removing undesired artifacts. Moreover, separate accessories need not be stored and cared for using embodiments of the present invention.

Although embodiments have been described above with reference to coating scanner features with a material or materials to facilitate identification of such features, the concepts of the present invention are applicable to various alternative embodiment configurations. For example, phosphorescent or fluorescent material may be added to a material (e.g., plastic) from which a particular scanner feature is made, thereby providing an imbedded adaptation according to the present invention. Additionally or alternatively, a material from which a particular scanner feature is made may be selected so as to facilitate identification of features, perhaps when illuminated with a particular light source, such as ultra-violet.

Embodiments of the invention provide for adapting all or any portion of a particular scanner feature for facilitating identification of features. For example, all portions of TMA 110 visible through platen 102, including calibration window 112, media backlight window 113, media adapter 114, and frame 115, may be coated with a clear or transparent fluorescent paint to result in identification of all aspects of the feature according to embodiments of the invention. However, it may not be desirable to identify all aspects of a particular feature according to embodiments of the present invention. For example, in an embodiment wherein determining appropriate cropping lines with respect to rectangular scanned media is to be accomplished, particular portions of the feature useful for making such cropping determinations (e.g., frame 115) may be adapted according to the present invention whereas other portions thereof are not so adapted. Moreover, aspects of a feature need not themselves be fully adapted to facilitate the identification of the feature. For example, a dot, line, cross-hatching, or other pattern may be implemented which provides desired information without a particular aspect of the feature being coated or otherwise treated according to embodiments of the present invention. Additionally or alternatively, specific information may be provided by the feature light according to embodiments of the present invention, such as by forming symbols or shapes (e.g., registration marks, numbers, targets, and/or the like) from materials providing feature light as described herein.

Although embodiments of the invention have been described herein with respect to adapting a particular feature, such as a TMA or ADF, for its identification, embodiments of the present invention may implement a technique wherein other aspects of a scanner are treated according to concepts of the present invention to facilitate identification of features thereof. For example, a side of scanner lid 104 visible through platen 102 may be provided with a grid of lines or dots of a fluorescent or phosphorescent material, or alternatively fully treated with such a material, for use in identifying scanner features, if desired.

The concepts of the present invention are not limited to any particular scanner configuration. For example, image scanner feature detection of embodiments of the present invention my be used in vertical or angled as well as horizontal scanner bed configurations.

What is claimed is:

1. A system for detecting an unwanted artifact in an image scanner, said system comprising:
   a treated component of the image scanner, the treated component treated such that light reflects differently from the treated component than light reflected by an image being scanned by the image scanner, the light reflected from the treated component facilitating detection and removal of the unwanted artifact in the image being scanned, the unwanted artifact caused by the light reflected by the treated component.

2. The system of claim 1, further comprising:
   a light source providing illumination of said treated component to cause radiation of light from the treated component that is different than the light reflected by the image being scanned.

3. The system of claim 1, further comprising:
   an optical array providing reception of light radiated from said treated component.

4. The system of claim 1, wherein said component of the image scanner is treated to reflect light at a different wavelength than said light being reflected by the image being scanned.

5. The system of claim 1, wherein said component of the image scanner is treated to reflect at a different time than said light being reflected by the image being scanned.

6. The system of claim 1, wherein said component of the image scanner is treated to reflect light at a different intensity than said light being reflected by the image being scanned.

7. The system of claim 1, wherein the treated component is a media handling apparatus comprising a transparent media adapter.

8. The system of claim 1, wherein select portions of the component of the image scanner are treated to facilitate automated feature detection.

9. The system of claim 8, wherein said select portions of the component of the image scanner comprise a repeating pattern of treated areas.

10. The system of claim 8, wherein said select portions of the component of the image scanner comprise treated symbols.

11. A system for detecting an unwanted artifact in an image scanner, said system comprising:
    a component of the image scanner treated to facilitate detection of an artifact in a scanned image caused by the component; and
    an optical array having at least one light receiver operable to receive light reflected from an imaging area and operable to receive light radiated from at least a portion of said scanner component, the light radiated from the scanner component being different than light reflected by an image being scanned in the imaging area to distinguish the artifact in the scanned image caused by the scanner component.

12. The system of claim 11, further comprising:
    a light source having at least one light emitter operable to illuminate said imaging area and to stimulate radiation of light energy from said at least a portion of said scanner component.

13. The system of claim 11, further comprising:
    a processor operable to identify said artifact in a scanned image formed from said received reflected light using said received radiated light.

14. The system of claim 11, wherein said treated component of the image scanner comprises a coating applied to a surface of said at least a portion of said scanner component.

15. The system of claim 11, wherein said treated component of the image scanner comprises a material imbedded into said at least a portion of said scanner component.

16. The system of claim 11, wherein said treated component of the image scanner comprises at least a fluorescent portion of said scanner component.

17. The system of claim 11, wherein said treated component of the image scanner comprises at least a phosphorescent portion of said scanner component.

* * * * *